United States Patent [19]

Crocker

[11] 4,272,474
[45] Jun. 9, 1981

[54] PROCESS FOR PRODUCING ARTICLES OF ULTRA HIGH MOLECULAR WEIGHT HIGH DENSITY POLYETHYLENE

[75] Inventor: Zenas Crocker, Quebec, Canada

[73] Assignee: Synergistics Chemicals Limited, Concorde, Canada

[21] Appl. No.: 91,780

[22] Filed: Nov. 6, 1979

[51] Int. Cl.³ .......................... B29F 3/02; B29F 3/014
[52] U.S. Cl. .............................. 264/176 R; 264/322; 264/325; 264/DIG. 65; 366/69; 366/97; 425/200
[58] Field of Search ................... 264/176 R, 211, 331, 264/325, 126, 349, 322, DIG. 65; 425/200, 201, 202; 366/69, 97

[56] References Cited

U.S. PATENT DOCUMENTS

| | | | |
|---|---|---|---|
| 3,226,766 | 1/1966 | Von Zelewsky et al. | 425/200 |
| 3,266,738 | 8/1966 | Goeser et al. | 241/98 |
| 3,665,068 | 5/1972 | Duling et al. | 264/211 |
| 3,944,536 | 3/1976 | Lupton et al. | 264/331 |
| 3,954,927 | 5/1976 | Duling et al. | 264/211 |
| 3,975,481 | 8/1976 | Baumgaertner | 264/126 |
| 4,110,391 | 8/1978 | Berzen et al. | 264/325 |
| 4,171,338 | 10/1979 | Mason | 264/211 |

*Primary Examiner*—Jeffery R. Thurlow
*Attorney, Agent, or Firm*—Larson, Taylor and Hinds

[57] ABSTRACT

A process for producing articles of ultra high molecular weight high density polyethylene is disclosed which avoids long heating and cooling cycles, and compacting pressures in the order of 3,000 to 4,000 lbs/sq. inch. The resin is intensively mixed and thermokinetically heated in an enclosed container with a plurality of blades attached to arms rotating about an axis with a blade tip speed of at least 18 m/sec. until the resin reaches a desired discharge temperature of at least 135° C. After being discharged from the mixing step, the ultra high molecular weight resin is formed into the desired shape within a time such that degradation does not occur.

17 Claims, 1 Drawing Figure

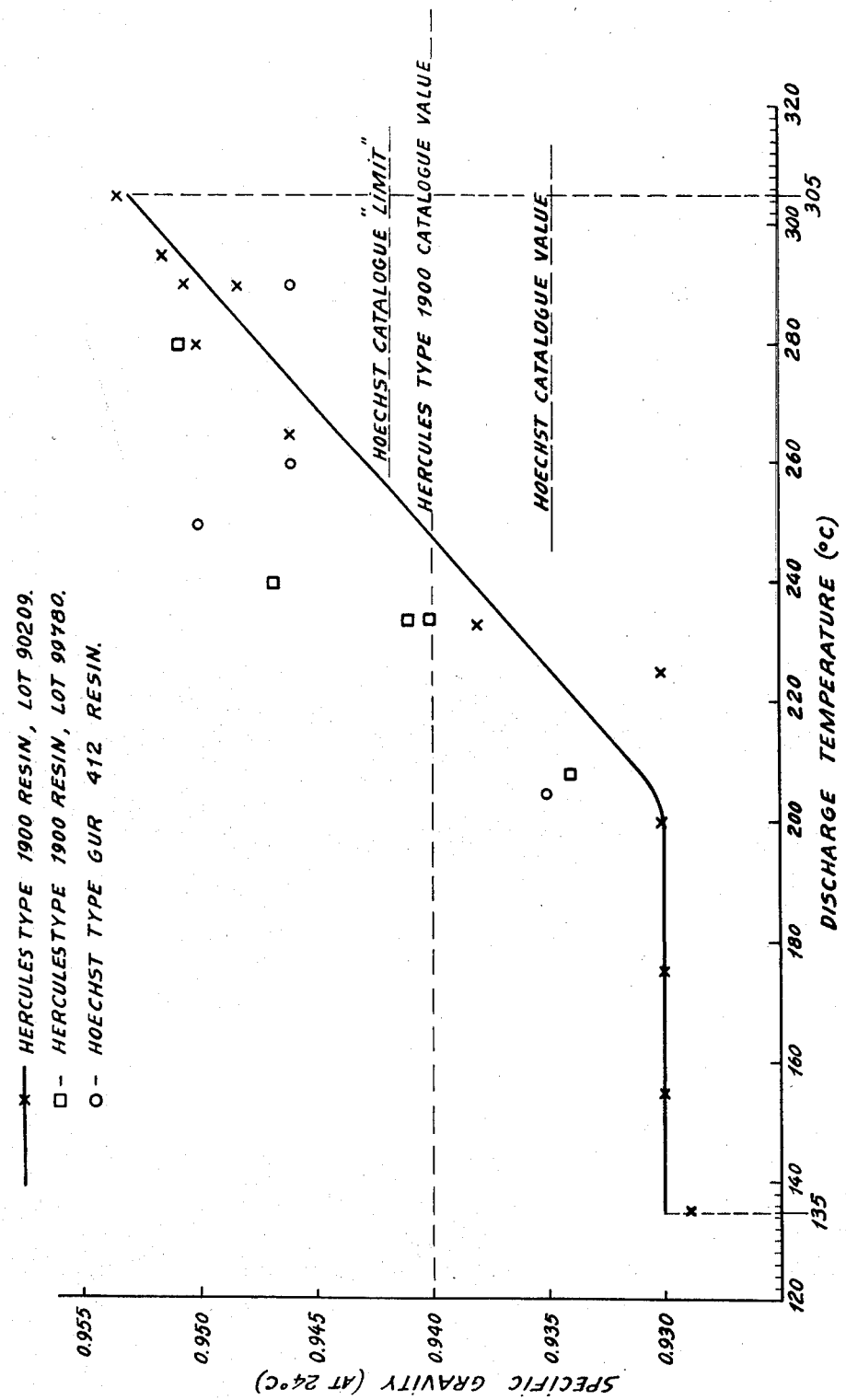

PROCESS FOR PRODUCING ARTICLES OF ULTRA HIGH MOLECULAR WEIGHT HIGH DENSITY POLYETHYLENE

The present invention relates to ultra high molecular weight (UHMW) polyethylene and more particularly to a process for manufacturing articles from UHMW polyethylene resin in shorter times and by simpler methods than has previously been possible. The term UHMW polyethylene refers to UHMW high density polyethylene.

UHMW polyethylene having a molecular weight in the range of 1.7 to $6 \times 10^6$ has been known for over twenty years. Outstanding physical properties including toughness, high energy absorption, impact strength, abrasion resistance and a low coefficient of friction along with excellent resistance to attack by solvents and corrosive chemicals make this a most attractive material for demanding applications. UHMW polyethylene in resin form is currently available from a number of suppliers but these resins cannot be processed either by conventional plastic fabrication techniques such as injection or compression molding, extrusion, press-forming, etc. or at process times considered normal for fabrication of plastic articles. With melt viscosities exceeding $10^9$ poise, UHMW polyethylene may be fabricated to final parts by machining semi-finished mill shapes or by specialized techniques used on hot powder, preforms or billets such as compression molding, stamping, forging or in some cases ram extrusion. These processes are cumbersome and slow compared to the direct melt molding and extrusions commonly employed with most plastic materials. For example, direct compression molding of UHMW polyethylene from powder or preforms requires specialized techniques with heated molds and complex pressure and temperature cycles lasting for several hours for thick sections and a minimum pressure of 1,000 lbs/sq. inch over the projected part surface area. The more common pressures are in the order of several tons per sq. inch.

Powder metallurgy processing techniques classically used with metal alloys and ceramics have been applied to UHMW polyethylene and special grades suitable for such processing have been developed. Although "free sintering" of such molding powders is then possible, preforms are usually made and then heated to approximately 150° C. for a period of about 2–4 hours under high pressure and then cooled at a similar rate. In one embodiment the preform itself is made from molding powders of a very narrow particle size distribution as disclosed by Baumgaertner in U.S. Pat. No. 3,847,888. Forging parts from billets made by these techniques involve two or more different molds with dies fabricated from heat treated tool steels. A time cycle of the order of hours is necessary and compacting pressures are in the order of 3,000 to 4,000 lbs/sq. inch. Furthermore, forging the billet to the final desired shape requires pressures in the range of 5–7 tons/sq. inch.

Thus, it will be seen that much of the economic advantages of UHMW polyethylene to the end user of plastics are lost due to the expensive fabrication methods which must be used. UHMW polyethylene, despite its outstanding properties and relatively low resin price, has made little penetration into the market place. For example, the fabrication of panels or sheets by direct compression of the powder is a difficult operation for thicknesses over a half inch and has not been possible for thin sheets, the alternative method of producing such sheets is by cutting them from a compression molded block. Furthermore, after cutting, further annealing is usually required which is a complicated operation.

It has now been found that UHMW polyethylene resins which are commercially available may be directly formed into articles or into hot shapes for immediate stamping or forging by initially carrying out a high intensity mixing and heating process wherein the resin is intensively mixed and thermokinetically heated in a manner controlling thermal degradation and without shearing action occurring. Shearing of particles of resin during processing is believed to be partly responsible along with thermal degradation for reducing the molecular weight and hence abrasion resistance and other properties of UHMW polyethylene. One type of high intensity mixer is shown by Goeser et al in U.S. Pat. No. 3,266,738 published Aug. 16, 1966. This patent describes a high intensity mixer available on the market today under the trade name DRAIS-GELIMAT. The mixer includes a plurality of blades which rotate about an axis within an enclosed container. In the past, tip speeds have been in the order of 20–25 meters/second. Higher tip speeds have not generally been feasible because of problems controlling the temperature of the batch at the discharge. Tip speeds above 25 m/sec. have recently been used in accordance with a control system as disclosed in co-pending application Ser. No: 962,778 filed Nov. 21, 1978. According to this application, a system is provided for monitoring the batch temperature in the mixer separately from the mixer temperature and then discharging the batch from the mixer when the batch temperature reaches a final predetermined level. It has surprisingly been found that UHMW polyethylene resin may be first processed in a high intensity mixer having blade tip speeds ranging from as high as 45 m/sec or more and as low as 18 m/sec. In this process the resin is intensively mixed and thermokinetically heated to the desired forming temperature which is in the range of about 135°–305° C. The heating occurs quickly without a shearing action and thermal degradation is controlled. To reach this temperature range the mixing time may be as short as 8 to 22 seconds or at low tip speeds may be up to 3 minutes or longer.

After the heated unstabilized resin is discharged from the high intensity mixer, it must be processed or formed into an article within a period of time such that significant thermal degradation does not occur. The higher the temperature at which the resin is discharged from the mixer, the shorter the time in which thermal degradation occurs. However, in the form it exits from the high intensity mixer, it may be processed directly by conventional or modified plastic fabrication techniques such as compression molding, transfer molding, forging, stamping, ram extrusion or pressing into the desired shape and thickness. This process eliminates the need to produce semi-finished billets for machining and the presently used long heating and cooling cycles to make preforms or billets for molding, stamping, or forging can be shortened from hours to minutes or even seconds.

Fabricated articles produced by these processes after the initial process step in a high intensity mixer have specific gravities of at least 0.93 and a molecular weight greater than $1.7 \times 10^6$. The physical properties are at least as good if not better than UHMW polyethylene articles produced by the known methods. Furthermore, articles retain the same morphological form as measured by X-ray diffraction as that associated with known UHMW polyethylene articles.

The present invention provides a process for the production of a fabricated article of a desired shape from ultra high molecular weight polyethylene having a molecular weight greater than $1.7 \times 10^6$ comprising the steps of: intensively mixing and thermokinetically heating ultra high molecular weight polyethylene resin in an enclosed container with a plurality of blades attached to arms rotating about an axis, with a blade tip speed of at least 18 m/second, until the batch reaches a desired discharge temperature of at least 135° C., and after the intensive mixing step forming the batch of ultra high molecular weight polyethylene into the desired shape within a time such that degradation does not occur.

In embodiments of the invention, the forming takes place in a press and the desired shape is a sheet or alternatively a coating layer on a substrate. In one embodiment, the pressure applied by the press is approximately 320 lbs/sq. inch and the initial temperature of the press is approximately 95° C. In another embodiment the press is cold. The blade tip speed in the mixer is preferably in the range of approximately 18 to 45 m/second, and the desired discharge temperature range is preferably approximately 135° to 305° C. The time the resin remains in the high intensity mixer to reach the desired discharge temperature is preferably within 3 minutes. In further embodiments, a cooling stage follows the forming step and the article is kept under pressure during the cooling stage.

The FIGURE which illustrates embodiments of the invention is a graph showing the discharge temperature of UHMW polyethylene resin leaving the mixer plotted against the specific gravity of sheets pressed from the resin.

Additives may be included with commercially available UHMW polyethylene resins to act as stabilizers to retard thermal degradation. Some degradation, accompanied by a decrease in molecular weight, can be anticipated during processing if the resin is exposed to high temperatures for extended times, but this may be reduced to a minimum by the use of established stabilization systems such as known stabilizing chemicals or by blanketing the hot resin with inert gases such as carbon dioxide or nitrogen during the various stages of the processing.

In a series of tests, batches of UHMW polyethylene resin were first processed in a DRAIS-GELIMAT high intensity mixer wherein the tip speeds of the rotating blades varied from 14.7 up to 38 m/second. In the tests, the high intensity mixer rotated at tip speeds of 14.7, 17.7, 20.1, 24.4, 31, 36 and 38 m/second. The mixer had a capacity of 1.4 liters and the batch sizes varied from approximately 100 grams to 260 grams of UHMW polyethylene resin. The mixer was a screw feed mixer wherein the material was fed into the high intensity mixer through a screw feed attached to the shaft and was discharged by means of a discharge flap at the bottom of the mixer. The discharge temperature for each batch in the high intensity mixer was controlled using the system disclosed in our co-pending application Ser. No: 962,778. An optical fiber cable led from a window in the casing of the high intensity mixer to an infra-red detecting head. The discharge temperature could be pre-set to the required value. Tests were carried out for pre-set temperatures from 135° to approximately 300° C. and the exact temperature of the batch material discharged from the intensive mixer was found to be within 2° to 5° C. of the pre-set value. The time from commencement of the high intensity mixing to the discharge was recorded for each test and was found to vary depending on rotation speeds of the blades, initial mixer body temperature, and temperature of the batch at the discharge from the mixer, from 8 seconds up to over 10 minutes. The last test was unsatisfactory because the temperature of the batch never reached 135° C.

Table 1 illustrates the temperature-time relationship for tests run with three different types of resins, at different tip speeds. Hercules type 1900 resin, lot 90209 which was a pure resin with a molecular weight of about $6 \times 10^6$ and I.V. of about 26. A second resin was Hercules type 1900 resin, lot 99780 which was also a pure resin and had a somewhat lower molecular weight and an I.V. of about 16. The third resin was Hoechst type GUR412 commercial powder grade resin containing a corrosion preventative agent and a molecular weight in the order of 3.5 to $4 \times 10^6$. The batch size was consistently 260 grams for each test.

TABLE 1

| Resin | Test No: | Tip Speed m/s | Start Temperature °C. | Discharge Temperature °C. | Time from Start |
|---|---|---|---|---|---|
| Hercules type 1900 Resin Lot 90209 (I.V. ≈26) | (1) | 14.7 | 88 | 113 | 10 minutes (unfinished) |
| | (2) | 17.7 | 94 | 147 | 7 minutes |
| | (3) | 20.1 | 118 | 200 | 6 min. 2 secs. |
| | (4) | 24.4 | 117 | 200 | 2 mins. 20 secs. |
| | (5) | 31 | at least 80 | 285 | 23 seconds |
| | (6) | 31 | at least 80 | 295 | 29 seconds |
| | (7) | 36 | at least 80 | 300(approx) | 25 seconds |
| | (8) | 38 | at least 80 | 135 | 8 seconds |
| | (9) | 38 | at least 80 | 155 | 12 seconds |
| | (10) | 38 | at least 80 | 175 | 14 seconds |
| | (11) | 38 | at least 80 | 200 | 15 seconds |
| | (12) | 38 | at least 80 | 233 | 17 seconds |
| | (13) | 38 | at least 80 | 241 | 22 seconds |
| | (14) | 38 | at least 80 | 280 | 22 seconds |
| Hercules type 1900 Resin Lot 99780 (I.V. ≈16) | (1) | 14.7 | 73 | 155 | over 8 minutes |
| | (2) | 14.7 | 100 | 135 | over 4 minutes |
| | (3) | 17.7 | 102 | 200 | 8 minutes |
| | (4) | 20.1 | 117 | 200 | 6 mins. 50 secs. |

TABLE 1-continued

| Resin | Test No: | Tip Speed m/s | Start Temperature °C. | Discharge Temperature °C. | Time from Start |
|---|---|---|---|---|---|
| | (5) | 24.4 | 120 | 200 | 2 mins. 45 secs. |
| | (6) | 31 | at least 80 | 207 | 17 seconds |
| | (7) | 38 | at least 80 | 233 | 16 seconds |
| | (8) | 38 | at least 80 | 280 | 26 seconds |
| Hoechst type GUR 412 Resin | (1) | 31 | at least 80 | 205 | 33 seconds |
| | (2) | 31 | at least 80 | 260(approx) | 30 seconds |
| | (3) | 31 | at least 80 | 290(approx) | 45 seconds |
| | (4) | 38 | at least 80 | 233(approx) | 16 seconds |
| | (5) | 38 | at least 80 | 280(approx) | 26 seconds |

With the Hercules lot 90209 resin, which has a higher molecular weight than the Hercules lot 99780 resin, it is seen from test number 1 that a tip speed of 14.7 m/second does not permit attainment of a preset temperature as low as 135° C. even within 10 minutes. A sheet was formed from the material which discharged at 113° C., but it was powdery and cracked easily with slight hand pressure. Test number 2 shows that a tip speed of 17.7 m/second resulted in a temperature of 147° C. after 7 minutes. A sheet formed from this test material easily cracked on bending although had a better appearance than the sheet from test number 1. Tests numbered 3 and 4 indicate faster times and temperatures are produced at increased tip speeds. Tests 5 to 14 show that tip speeds over 30 m/second all produce times less than 30 seconds.

Test No. 1 of the Hercules lot 99780 resin indicates that there is not much reduction in time for processing the lower molecular weight resin over the lot 90209 resin. Test No. 2 shows that when the mixer is pre-heated to 100° C. at the start of the test, the mixing time is reduced to approximately 4 minutes. Test No. 3 demonstrates that it takes 8 minutes to reach 200° C. at a tip speed of 17.7 m/second and the brownish colour of the batch on discharge indicated that considerable thermal degrading had occurred in the material. Tests 4 to 8 were consistent with lot 90209 resin. The Hoechst type GUR 412 resin tests were consistent with the Hercules resin tests. Some variations are to be expected because the exact start temperature for each test was not recorded.

A graphical display of these tests illustrate that a blade tip speed of at least 18 m/second is required to produce quality sheets of UHMW polyethylene. However, such a tip speed produces a time factor 20 times longer than processing at a tip speed of 38 m/second.

The batch discharged from the mixer in test number 14 of Hercules lot 90209 was found to degrade if it remained in air and turned brown in approximately 30 seconds. However, inasmuch as the tests run on the Hercules resin did not have any stabilizers added, this degrading time could be extended by the addition of stabilizers. When the batch of unstabilized resin was formed into an article immediately after being discharged from the mixer, degradation did not occur. Each batch as it was discharged from the intensive mixer was passed to the forming step, which in most cases was a press, and the resin was pressed into sheets usually 0.125 ins. thick prior to characterization tests. Tests have indicated that sheets could be pressed out of the processed resin varying in thickness from 0.004 inches or more. The mold or frame into which the heated resin was placed was first heated to a temperature of at least 95° C. and sheets 9 inches by 6 inches were pressed between Teflon sheets to avoid contamination of the UHMW polyethylene sheets. The press exerted a pressure of up to 740 lbs/sq. inch on the sheets. The time for pressing was 3 minutes followed by a cooling step of about 4 minutes in which water was passed through jackets surrounding the mold to cool the mold and thus the sheet of UHMW polyethylene. It is preferred to keep the pressure applied by the press to below 1000 lbs/sq. inch on the sheets to permit the use of a simple light press rather than a heavy press needed for the more conventional ways of producing UHMW polyethylene sheets.

Gears were also directly compression molded with the mold and piston pre-heated to 95° C. Batches of 200 grams of Hercules lot 90209 resin were first processed in a high intensity mixer up to discharge temperatures in the range of approximately 135° to 305° C. The hot resin batches were placed in the pre-heated mold and constant pressure applied for approximately 3 minutes. The pressure was continued during a cooling cycle which lasted for about 4 minutes, while cooling water was circulated through the mold. Further tests were carried out whereby the UHMW polyethylene hot resin discharged from the high intensity mixer was formed into a billet which was then allowed to cool below the solid phase forming temperature of 135° C. The cooled billet was then formed into a finished shape by direct stamping or forging. In another embodiment the hot resin may be discharged from the high intensity mixer directly into a continuous or discontinuous compression molding device such as a ram extruder and formed into a finished article of the desired profile such as a pipe, rod, sheet or other shape.

Specific gravity of the articles was determined by the standard displacement of water technique made on pieces weighing approximately 3 grams cut from 0.125 inches thick sheets. It was found that the specific gravity of the sheet increases as a function of the discharge temperature above about 200° C. This is illustrated in the FIGURE wherein a discharge temperature up to about 200° C. produces a substantially constant specific gravity of about 0.930. The specific gravity of the product at discharge temperatures above 200° C. varied from 0.93 to 0.96. As is illustrated in the FIGURE, the specific gravity can be reproducibly determined simply by varying the discharge temperature from the high intensity mixer. The specific gravity of the product produced from the high intensity mixer at discharge temperatures above 200° C. is higher than existing products made from UHMW polyethylene. The higher discharge temperatures are generally attained at higher tip speeds, in the tests this was 38 m/second. The Hoechst and Hercules catalogue values of specific gravity are shown on the graph to be lower than those attained with high discharge temperatures.

Tests were determined to find the yield strength for samples. Table 2 beneath shows these results.

TABLE 2

| Sample | Preset Temp. (°C.) | Yield Strength (p.s.i.) |
|---|---|---|
| Processed Resin | | |
| Hercules 90209 | 241 | 3340 |
| | 280 | 3326 |
| | 295 | 3899 |
| Hercules 99780 | 280 | 3482 |
| Commerical Sheets | | |
| Hoechst Sheet | — | 3380 |
| Eurocan Card | — | 3103 |
| Hercules Type 1900 | | |
| Resin Catalog Value | — | 3400 |

The dispersion capabilities of the high intensity mixer process was demonstrated by adding one percent of carbon black to the UHMW polyethylene resin prior to feeding into the mixer. An excellent dispersion of carbon particles throughout the fabricated article was obtained. This dispersion occurred after only 24 seconds in the high intensity mixer and was observed by optical microscopy. The microscope illustrated that each resin particle was uniformly surrounded by carbon and similar photographic evidence was obtained for discharge temperatures up to 280° C.

In another test a deeply uniform green coloured sheet was produced from Hercules lot 90209 resin at a tip speed of 35.3 m/second, a preset temperature of 225° C. and at a processing time of 28 seconds. 2 grams of green colouring were added to 260 grams of resin. The resulting sheet was coloured evenly throughout.

Gears were made from Hercules lot 90209 resin after processing in a high intensity mixer at discharge temperatures of 280° C. When the molded articles were sliced into segments, the specific gravity was uniform for the different segments and corresponded closely to that indicated for pre-set discharge temperatures as shown in FIG. 1. Successes were achieved with forming gears from processed resin which was discharged at temperatures of 135° up to 305° C. It was shown by these tests that articles could be molded according to the present process in short time cycles of less than 10 minutes from the initial commencement of feeding a batch of resin into a high intensity mixer to the finished fabricated article which has been cooled in the mold.

Tests were carried out to demonstrate the fabrication of pressed sheets by processing UHMW polyethylene resin in a high intensity mixer followed by a forming step in a press. The high intensity mixer was set for a low range of discharge temperatures and the press was not heated. Table 3 shows the results of these tests wherein 260 grams of Hercules lot 90209 resin were fed to a Gelimat set at a tip speed of 38 m/second.

TABLE 3

| Preset Discharge Temp. (°C.) | Time in High Intensity Mixer (Secs.) | S.G. of Pressed Sheet |
|---|---|---|
| 225 | 19 | 0.930 |
| 200 | 15 | 0.930 |
| 175 | 14 | 0.930 |
| 155 | 12 | 0.930 |
| 135 | 8 | 0.929 |

As illustrated in Table 3, pre-set discharge temperatures of 135° C. produce a pressed sheet having a specific gravity of 0.929. The process time in the high intensity mixer was only 8 seconds. At discharge temperatures below 200° C. no discoloration whatsoever was detected in the batches even after they were left at room temperature for some time without forming. It was interesting to note that the specific gravity of the pressed sheets remain substantially the same over the temperature range of 135° to 225° C. With a cold press and cold mold and a pre-set discharge temperature of 175° C., the sheet surface had a slight powdery looking appearance with a specific gravity of 0.927. When the mold was pre-heated to about 95° C. and the press remained cold, a satisfactory appearing pressed sheet was achieved. This sheet had a specific gravity of 0.930. Surface hardness of the sheets was measured on the Shore D scale and on all samples was in the range of 60-62 comparing well with commercially available articles and with published catalogue values.

Abrasion tests were carried out with samples of UHMW polyethylene sheets produced according to the present invention. The tests followed a sand slurry abrasion technique and comparison tests with steel, Teflon (Registered Trade Mark of tetrafluoroethylene), and UHMW polyethylene articles made by existing methods showed that the sheets had abrasion properties at least as good as other UHMW polyethylene articles fabricated by known conventional methods.

Dielectric tests were carried out to determine the dielectric constant and dissipation factor on UHMW polyethylene sheets made according to the process of the present invention. The tests indicate that there is no significant increase in degradation (oxidation to form polar groups) occurring in the sheets which were processed at the higher range of preset temperatures.

A press was used to produce sheets as thin as 0.010 inches. These sheets showed a high degree of transparency even at discharge temperatures as low as 135° C. In tests designed specifically to produce thin sheets, small amounts of UHMW polyethylene resin were processed in a high intensity mixer, with a preset discharge temperature of 280° C. The heated resin was platen pressed at a pressure of 320 lbs/sq. inch between Teflon liners. Thin films as low as 0.010 inches thick were obtained with high transparency.

Tests to demonstrate coatings on various substrates were carried out. Excellent adhesion was obtained on steel surfaces covered with 100 grams of Hercules lot 90209 processed in a high intensity mixer with a preset discharge temperature of 280° C. and then pressed at a pressure of 320 lbs/sq. inch at a temperature of approximately 170° C. Adhesion was substantially the same with preheated or cold substrate surfaces. A high degree of transparency of the adhering layer of UHWM polyethylene indicated the potential for chemical resistant coatings through which visual observations could be made.

The embodiments of the invention in which an exclusive property or privilege is claimed are defined as follows:

1. A process for the production of a fabricated article of a desired shape from ultra high molecular weight high density polyethylene having a molecular weight greater than $1.7 \times 10^6$ comprising the steps of:
   intensively mixing and thermo-kinetically heating ultra high molecular weight polyethylene resin in an enclosed container with a plurality of blades attached to arms rotating about an axis, with a blade tip speed of at least 18 m/second, the resin is heated quickly at a desired discharge temperature of at least 135° C. without shearing action occurring and with thermal degradation being controlled, discharging the resin after the intensive mixing step, and forming the ultra high molecular weight polyethylene resin into the desired shape within a time such that degradation does not occur.

2. The process according to claim 1 wherein the time to reach the desired discharge temperature is within 3 minutes.

3. The process according to claim 1 wherein the blade tip speed is in the range of approximately 18 to 45 m/second.

4. The process according to claim 1 wherein the blade tip speed is at least 35 m/second and the resin reaches the desired discharge temperature in a time in the range of from approximately 8 to 24 seconds.

5. The process according to claim 1 wherein the desired discharge temperature is in the range of approximately 135° to 305° C.

6. The process according to claim 1 wherein the forming takes place in a press and the desired shape is a sheet.

7. The process according to claim 1 wherein the forming takes place in a press and desired shape is a coating layer on a substrate.

8. The process according to claim 1 wherein the forming takes place at a pressure below 1000 lbs/sq. inch.

9. The process according to claim 7 wherein the substrate is a metal plate.

10. The process according to claim 6 wherein the thickness of the finished sheet is at least 0.004 inches.

11. The process according to claim 1 wherein the resin reaches a discharge temperature of at least 240° C. in the intensive mixing step and the specific gravity is in the range of approximately 0.94 to 0.96.

12. The process according to claim 1 wherein the forming step is compression molding.

13. The process according to claim 6 or claim 7 wherein the press exerts a pressure in the range of approximately 320 to 740 lbs/sq. inch over the surface of the sheet.

14. The process according to claim 12 wherein the forming step includes a piston forcing the resin into a mold and including the step of pre-heating the piston and mold to at least 95° C., the piston exerting a constant pressure for approximately 3 minutes whilst the mold is heated to at least 95° C., and a cooling step whilst the piston still exerts the constant pressure for a time in the range of from approximately 3 to 5 minutes.

15. The process according to claim 1 wherein the desired shape is a billet which is cooled to a temperature suitable for forming into a finished article by direct stamping or forging.

16. The process according to claim 1 wherein the resin is discharged from the intensive mixing step directly into a compression molding step.

17. The process according to claim 1 wherein the forming occurs in a ram extruder.

* * * * *